United States Patent Office 3,017,344
Patented Jan. 16, 1962

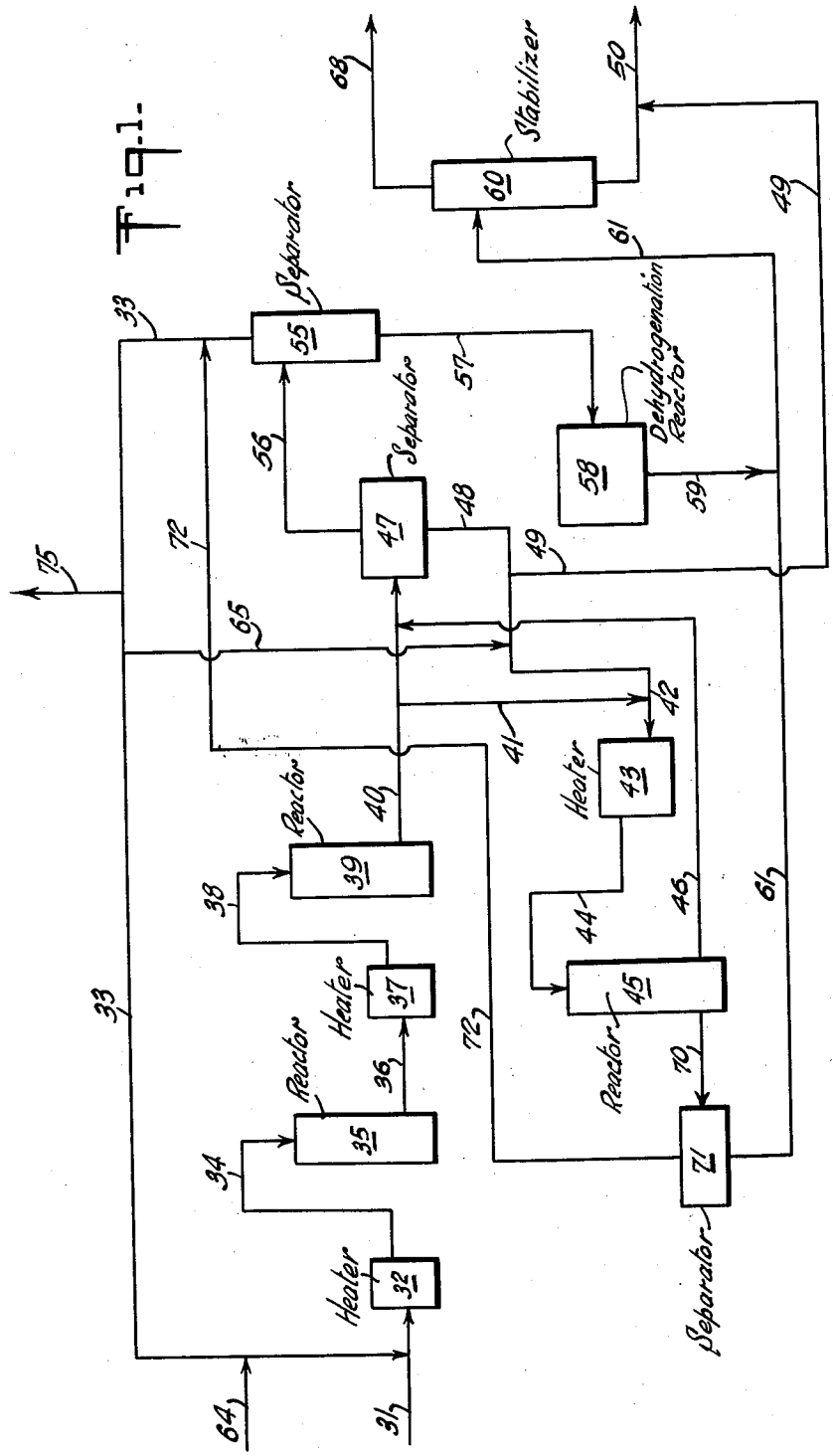

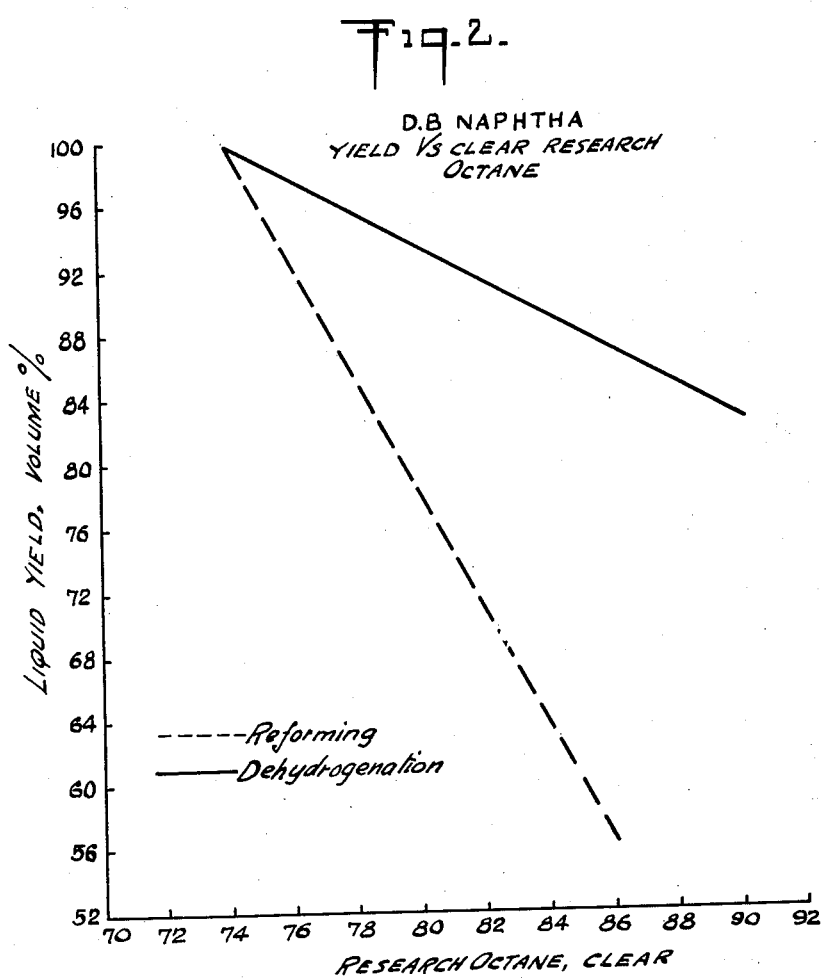

3,017,344
SERIAL REFORMING OF HYDROCARBONS
Robert A. Woodle, Nederland, Tex., assignor to Texaco Inc., a corporation of Delaware
Filed May 5, 1958, Ser. No. 732,926
6 Claims. (Cl. 208—65)

This invention relates to the treatment of hydrocarbons. More particularly, it relates to the catalytic treatment of low octane hydrocarbon fractions boiling in the motor fuel range to produce motor fuel fractions of improved octane number.

In recent years catalytic reforming for the upgrading of motor fuel fractions has achieved considerable popularity. In the catalytic reforming procedure, various octane improving reactions take place. In the more important of these reactions, naphthenes containing 6 carbon atom rings are dehydrogenated to aromatics, alkyl naphthenes containing 5 carbon atom rings are dehydroisomerized to aromatics, and $C_6$ and higher paraffins are dehydrocyclized to aromatics. Various other reactions such as the isomerization of straight chain paraffins to branched chain paraffins and the hydrocracking of long chain paraffins also take place.

Originally, catalytic reforming was effected using a molybdena catalyst generally supported on alumina. More recently the noble metal catalyst such as the platinum type catalyst has been developed and has achieved considerable popularity with the refinery operators.

The platinum type catalyst may be used in various types of reactor systems such as the fixed bed system in which the catalyst remains in a fixed position during the onstream processing, the moving bed system in which a granular or pelleted catalyst is circulated continuously through the reactor or the fluid bed system where the catalyst, in such finely-divided form that it behaves as a liquid, is continuously circulated.

The platinum type catalyst used for the fixed bed reactors is usually in the form of pellets having a diameter of about 0.125 inch. In the moving bed process the catalyst is used in the form of small pellets or beads while in the fluid bed system the catalyst is in the form of small particles in the micron range, generally below 200 microns in diameter with a major proportion between 20 and 80 microns.

The platinum type catalyst generally contains from 0.05 to 2% platinum supported on alumina. The catalyst may also contain combined halogen. When the halogen is chlorine, the catalyst may contain 0.1–8%, preferably 0.1–4% combined chlorine. However, if the halogen is fluorine, 0.1 to 4% may be present although 0.1–2% is preferred.

Although the use of the platinum type catalyst in the catalytic reforming of naphtha can effectively raise the leaded octane rating of the naphtha as much in some cases as 40 numbers, for example, from 55 to 95, the platinum type reforming catalyst does not lend itself to the economic conversion of most naphthas to 100 and higher octane motor fuels. Under operating conditions of normal or moderate severity, the platinum catalyst can convert straight run naphthas having leaded octane numbers ranging from 55 to 75 to reformates having leaded octane numbers ranging from 93 to 95. Under operating conditions of high severity the same naphthas may be converted to motor fuels having leaded octane numbers of 97 to 99. To obtain octane numbers in excess of 100, it is necessary to conduct the reforming process using the platinum catalyst under conditions of extremely high severity. However, experience has shown that the life of the platinum catalyst, when the reaction is carried out under conditions to produce a reformate having a leaded octane number of 101 is only about 85% of the life of the catalyst when the reaction is conducted under conditions to produce a reformate having a leaded octane number of 99. In other words, the additional two octane numbers cut the life of the catalyst approximately 15%.

It is an object of the present invention to provide a process for the production of motor fuel having a high octane number.

Another object of the invention is to prolong the life of the platinum reforming catalyst while producing high octane motor fuel.

Still another object of the invention is to upgrade the octane rating of the low octane number, low boiling portion of a catalytic reformate. Various other objects will be obvious to those skilled in the art from the following disclosure.

According to the invention the hydrocarbon fraction, usually straight run naphtha, which is to be upgraded is contacted with a platinum reforming catalyst under reforming conditions. The reformate is separated into a lower boiling fraction and a higher boiling fraction and the lower boiling fraction is then contacted with a dehydrogenation catalyst.

The platinum type reforming catalyst used in the first stage of the process of the present invention is well known in the art and may be of the type disclosed in U.S. Patents 2,560,379 and 2,566,521. The dehydrogenation catalyst used in the second stage is preferably a chromia-alumina catalyst. This type of catalyst is also well known and readily available and usually contains from about 10 to 25% chromia deposited on alumina. Other dehydrogenation catalysts may also be used although not necessarily with equivalent results. In both the first stage and the second stage of the process the catalysts may be used in either the fixed or fluidized bed type of operation.

Since the overall reforming reaction is endothermic, it has been found expedient in commercial installations when the catalytic reforming process is carried out in the fixed bed type of operation to provide a plurality of reforming reactors, usually three or four, through which the naphtha to be reformed flows serially and for the purpose of maintaining the reaction temperature to provide each catalytic reactor with a preheater so that the flow of the feed is through a first heater, then a first reactor, a second heater and a second reactor, a third heater and a third reactor and, in a four reactor system a fourth heater and a fourth reactor. After leaving the last reactor the reformed naphtha ordinarily is separated from gases such as hydrogen, hydrogen sulfide, $C_1$–$C_3$ hydrocarbons and the like, stabilized and then sent to storage.

When the reforming operation is conducted with the catalyst in the form of a fixed bed, conversion temperatures may range from 850–1100° F. while the pressure may suitably range from 200–700 p.s.i.g. Hydrogen containing gas employed in the conversion will range from 2,000–10,000 standard cubic feet per barrel of feed. The space velocity may range from 1–5 volumes of feed per volume of catalyst per hour although space velocities of from 2–3 v./v./hr. are preferred. When the platinum reforming catalyst is maintained as a fluidized bed, the temperature will range from 850–950° F. and the pressure from 0–300 p.s.i.g. The weight hourly space velocity, that is, the weight of feed per hour per unit weight of catalyst may range from 0.25–4, preferably 2–3 while the hydrogen containing gas is recycled at the rate of from about 4,000–8,000 standard cubic feet per barrel of feed.

The dehydrogenation operation using a fixed bed of chromia-alumina catalyst is conducted at a temperature below 1200° F., preferably from 800–1000° F. Pressures are preferably maintained at about atmospheric although both subatmospheric or superatmospheric pressures may be used. The space velocity may range from 0.1 to 2.0 v./v./hr., a preferred range being from 0.2 to 1.0 v./v./hr. When the dehydrogenation of the light naphtha is carried out with the chromia-alumina catalyst in the form of a fluidized bed, the reaction conditions are essentially the same as those indicated for the fixed bed type of operation.

In one embodiment of the present invention the reformate which has been subjected to a complete reforming treatment is separated into a low boiling fraction and a high boiling fraction, the separation being made at 200–240° F. The low boiling fraction is subjected to dehydrogenation. The product may then be combined with the high boiling fraction. In another embodiment of the invention which applies particularly to the fixed bed type of operation involving a plurality of reactors, partially reformed naphtha is separated into light and heavy fractions. The light fraction is dehydrogenated, the heavy fraction is subjected to additional reforming and the fractions if so desired are then combined.

The process of the present invention may be better illustrated by reference to FIG. 1 of the accompanying drawings which illustrates diagrammatically a flow sheet for the practice of the present invention.

Naphtha from any suitable source is introduced into the system through line 31 and together with hydrogen from line 33 is passed into heater 32 wherein the temperature of the mixture is raised to approximately 950° F. The heated mixture leaves heater 32 through line 34 and is introduced into reactor 35 where it is contacted with the platinum reforming catalyst. The mixture at a temperature of about 850° F. leaves reactor 35 through line 36 and is reheated in heater 37 to a temperature of about 925° F. and is introduced into reactor 39 through line 38. The mixture then leaves reactor 39 through lines 40, 41 and 42 and is heated in heater 43 from a temperature of about 875° F. to a temperature of about 915° F. The heated mixture then passes through line 44 to reactor 45 where the temperature drops to about 890° F. Effluent from reactor 45 is introduced through lines 46 and 40 to separator 47 where heavy naphtha having an I.B.P. of about 210–240° F. is withdrawn through line 48 and sent to storage through lines 49 and 50. The light naphtha fraction together with gases such as hydrogen and H$_2$S is introduced into separator 55 through line 56. The C$_4$+ portion of the mixture leaves separator 55 through line 57 and is contacted with a dehydrogenation catalyst in reactor 58. The dehydrogenation product is transferred from reactor 58 to stabilizer 60 through lines 59 and 61. C$_4$'s and lighter hydrocarbons are removed from stabilizer 60 through line 68 for use, if so desired, in polymerization or alkylation reactions and the stabilized product is sent to storage through line 50. Hydrogen and other gaseous components are withdrawn from separator 55 and after removal of the H$_2$S in an amine scrubber (not shown), the hydrogen-containing gas is compressed and is recycled to heater 32 through lines 33 and 31. It may also be advisable in some instances to bleed some of the hydrogen containing C$_1$–C$_3$ hydrocarbons from the system through line 75 to prevent the buildup of gaseous hydrocarbons in the recycle gas stream. Fresh hydrogen, if necessary, may be introduced into the system through line 64.

In another embodiment of the invention the reaction mixture leaving reactor 39 is transferred to separator 47 through line 40. In separator 47, a heavy naphtha having an I.B.P. of about 200–230° F. is separated and transferred to heater 43 through lines 48 and 42 and with hydrogen from line 65 is heated to a temperature of about 915° F. The mixture is then sent to reactor 45 through line 44. After passing through reactor 45, the mixture is sent through line 70 to separator 71 where hydrogen containing gases are separated from the heavy naphtha fraction and recycled through the system by means of line 72, 33 and 31. The heavy naphtha is sent to stabilizer 60 through line 61. Stabilized naphtha is withdrawn through line 50 and C$_4$ and lighter hydrocarbons are removed through line 68. Light naphtha together with hydrogen containing gases is sent from separator 47 through line 56 to separator 55. The light naphtha withdrawn through line 57 is dehydrogenated in reactor 58 by contact with a dehydrogenation catalyst and the product withdrawn through line 59 sent to stabilizer 60 through line 61. In stabilizer 60, separation is made, the C$_4$ and lighter hydrocarbons being withdrawn through line 68 and the stabilized product being sent to storage through line 50. The hydrogen containing gases withdrawn from separator 55 are purified and recycled through lines 33 and 31.

The following examples are given for illustrative purposes only:

*Example I*

A full range straight run naphtha (I.B.P.—420° F.) is reformed by being passed over a platinum on alumina catalyst containing 0.3% platinum at an average temperature of 915° F., a pressure of 500 p.s.i.g., a gas recycle rate of 8.8 mols of hydrogen per mol of hydrocarbon feed, and a space velocity of 2.8 volumes of feed per hour per volume of catalyst to produce a debutanized product naphtha having ASTM Research Octane numbers of 91.6 clear and 99.0 leaded (containing 3 cc. TEL per gallon).

The product naphtha is then separated into light and heavy fractions by distilling off about 30% of light material. The light naphtha fraction (E.P. 234° F.) is then passed over a chromia-alumina catalyst containing 12.9 weight percent chromium at a temperature of 897° F. at substantially atmospheric pressure. The dehydrogenation product is debutanized and combined with the heavy naphtha fraction. The combined product has ASTM Research Octane numbers of 96.5 clear and 101.3 leaded.

*Example II*

In this example a full range straight run naphtha is introduced into a catalytic reforming system containing a plurality of reactors. A light liquid fraction amounting to 30.1 volume percent is distilled from the partially reformed naphtha prior to treatment in the final reactor. The light naphtha (C$_5$—232° F.) has the following characteristics.

ASTM Research Octane No.:
    Clear _____ 73.9
    +3 cc. of TEL_____ 91.8

LTFD, [1] volume percent:
    N-butane _____ 0.3
    Isopentane _____ 15.5
    N-pentane _____ 10.2
    C$_5$ olefins_____ 0.8
    Hexanes plus_____ 73.2

[1] Low temperature fractional distillation.

The light naphtha is then contacted in 3 comparative runs with a fluidized chromia-alumina catalyst containing 18.9% chromia and a platinum on alumina reforming catalyst containing 0.3% platinum. Conditions of run 2 are controlled to yield substantially the same amount of liquid product as run 1. Conditions of run 3 are regulated to produce a product having substantially the same octane rating as the product of run 1. Details of the runs are tabulated below:

| Run No. | 1 | 2 | 3 |
|---|---|---|---|
| Catalyst | Fluidized Chromia-Alumina | Fluidized Platinum | Fixed Bed Platinum |
| Temperature, °F | 897 | 897 | 960 |
| Pressure, p.s.i.g. | 0.33 in. $H_2O$ | 0.52 in. $H_2O$ | 500 |
| Space Velocity, wt./hr./wt. | 0.64 | 2.23 | 2.9 |
| Hydrogen Recycle, s.c.f./bbl. feed | | | 4100 |
| Hydrogen Production, s.c.f./bbl. feed | 419 | 95 | 99 |
| Nominally Debutanized Liquid Product, vol. Percent Fresh Feed | 91.06 | 93.77 | 72.02 |
| ASTM Research Octane No.: | | | |
| Clear | 85.2 | 74.9 | 84.7 |
| +3 cc. TEL/gallon | 96.5 | 91.8 | 96.9 |
| Yields, Basis Fresh Feed: | | | |
| $C_3$– (Dry Gas), wt. Percent | 2.89 | 2.52 | 14.7 |
| Butanes, volume percent | 2.55 | 2.09 | 14.4 |
| Isopentane, volume percent | 18.46 | 14.17 | 16.8 |
| N-pentane, volume percent | 6.23 | 9.96 | 11.8 |
| $C_5$ olefins, volume percent | 1.80 | 0.98 | 1.0 |
| Hexanes plus, volume percent | 64.57 | 68.66 | 40.5 |

It appears that treating the light naphtha with the chromia-alumina catalyst is clearly the most effective method for upgrading the naphtha. The liquid product of run 2, using the platinum catalyst, while substantially equal in yield to that of run 1, using the chromia-alumina catalyst, is distinctly inferior in anti-knock rating to the liquid product of run 1. The liquid product of run 3, also using a platinum catalyst, while substantially equal in anti-knock rating to the liquid product of run 1 is obtained in a yield much lower than in run 1. Other advantages are also apparent. Not only does the liquid product of run 1 have a higher isopentane concentration than the starting material as distinguished from the lower isopentane concentrations of the liquid products of runs 2 or 3 but, more significantly, the isopentane to normal pentane ratio of the liquid product of run 1 is 2.96, almost double the isopentane to normal pentane ratio of the starting material, i.e. 1.52, whereas in runs 2 and 3, the isopentane to normal pentane ratio of the liquid product is only 1.42.

*Example III*

Using the same light naphtha and the same catalysts used in the comparative runs made in Example II several runs are made at varying degrees of intensity, the runs with the chromia-alumina dehydrogenation catalyst being made at temperatures ranging from 800–1000° F., pressures ranging from 0.31 to 0.48 inch of $H_2O$ and space velocities of from 0.28 to 0.90, those using the platinum reforming catalyst being made at temperatures ranging from 895 to 1100° F., pressures from 0.4 to 0.7 inch of $H_2O$ and space velocities of from 2.04 to 2.23. The yields of debutanized naphtha product vs. clear octane numbers for the respective catalysts are plotted in accompanying FIG. 2 which shows clearly the superiority of the chromia-alumina catalyst over the platinum catalyst for the upgrading of the partially reformed naphtha.

From the preceding examples it is clear that the octane number of a naphtha which has been reformed using a platinum on alumina reforming catalyst can be improved by separating the naphtha into light and heavy fractions, contacting the light fraction with a dehydrogenation catalyst and then combining the product with the heavy fraction. It is also clear that in the fixed bed type of reforming operation using a plurality of reactors containing platinum on alumina reforming catalyst, the lower boiling portion of the partially reformed naphtha has reached optimum upgrading prior to the final reactor. Consequently, the lower boiling fraction may be advantageously removed from the reactant stream and contacted with a dehydrogenation catalyst such as chromia on alumina. By operating in this manner the low boiling, low octane portion of the partially reformed feed stock is not sent through the final reactor which under normal operating conditions has little or no effect on its octane number but instead is passed into contact with a chromia-alumina catalyst which improves its octane number to a greater extent with less of a yield loss than does the platinum catalyst. From this it follows that the amount of catalyst in the final reactor of a system containing a plurality of reactors can be reduced by approximately one-third without affecting the efficiency of the reforming system since the flow to the final reactor is reduced by about 30 volume percent.

It is to be understood that variations and modifications may be made in the foregoing disclosure without departing from the spirit of the invention.

I claim:

1. In a process for improving the octane number of a petroleum naphtha in which a full range petroleum naphtha is reformed by being passed serially with hydrogen through at least three reforming reactors containing a platinum reforming catalyst at a temperature between 850 and 1100° F. and a pressure between 200 and 700 p.s.i.g., the steps which comprise separating the partially reformed full range naphtha prior to the final catalytic reactor into a light naphtha fraction having a final boiling point within the range of 200–240° F. and a heavy naphtha fraction having an initial boiling point within the range of 200–240° F., contacting said light naphtha fraction with a chromia-alumina dehydrogenation catalyst at a temperature of 800–1000° F., separately passing said heavy naphtha fraction through the balance of the reforming reactors and combining the fully reformed heavy naphtha with the partially reformed-dehydrogenated light naphtha.

2. The process of claim 1 in which the dehydrogenation catalyst is maintained in a fluidized state during the dehydrogenation reaction.

3. The process of claim 1 in which the dehydrogenation catalyst is maintained in a form of a fixed bed during the dehydrogenation reaction.

4. In a process for improving the octane number of a petroleum naphtha in which a full range petroleum naphtha is reformed by being passed serially with hydrogen through at least three reforming reactors containing a platinum reforming catalyst at a temperature between 850 and 1100° F. and a pressure between 200 and 700 p.s.i.g., the steps which comprise removing partially reformed naphtha from the penultimate reactor, separating the partially reformed naphtha into a light naphtha fraction having a final boiling point within the range of 200–240° F. and a heavy naphtha fraction having an initial boiling point within the range of 200–240° F., contacting said light naphtha fraction with a chromia-alumina dehydrogenation catalyst under dehydrogenation conditions including a temperature between 800 and 1000° F., separating normally gaseous hydrocarbons from the normally liquid portion of the dehydrogenation product, subjecting said normally gaseous hydrocarbons to a hydrocarbon addition reaction to produce a liquid fraction boiling in the motor fuel range, separately passing said heavy naphtha fraction through the final reforming reactor and combining the fully reformed heavy naphtha, the normally liquid portion of the dehydrogenation product and the liquid hydrocarbon addition reaction product.

5. The process of claim 4 in which the hydrocarbon addition reaction is a polymerization reaction.

6. The process of claim 4 in which the hydrocarbon addition reaction is an alkylation reaction.

(References on following page)

References Cited in the file of this patent

UNITED STATES PATENTS

| | | |
|---|---|---|
| 2,285,727 | Komarewsky | June 9, 1942 |
| 2,401,649 | Leffer | June 4, 1946 |
| 2,409,695 | Laughlin | Oct. 22, 1946 |
| 2,758,062 | Arundale et al. | Aug. 7, 1956 |
| 2,767,124 | Myers | Oct. 16, 1956 |
| 2,853,436 | Roberts | Sept. 23, 1958 |
| 2,867,576 | Honeycutt | Jan. 6, 1959 |
| 2,890,994 | Donnell et al. | June 16, 1959 |
| 2,897,132 | Knight | July 28, 1959 |
| 2,918,422 | Evering et al. | Dec. 22, 1959 |
| 2,937,132 | Voorhies | May 17, 1960 |

FOREIGN PATENTS

| | | |
|---|---|---|
| 538,992 | Canada | Apr. 2, 1957 |